United States Patent [19]

Stuermer

[11] 4,421,222
[45] Dec. 20, 1983

[54] APPARATUS FOR ARRANGING WORKPIECES IN A PREDICTABLE RELATIONSHIP AND GROUPING

[75] Inventor: Karl H. Stuermer, New Richmond, Ohio

[73] Assignee: Planet Products Inc., Cincinnati, Ohio

[21] Appl. No.: 292,741

[22] Filed: Aug. 14, 1981

[51] Int. Cl.³ .............................................. B65G 47/24
[52] U.S. Cl. ................................... 198/382; 198/396; 198/405
[58] Field of Search ............... 198/443, 444, 445, 415, 198/461, 462, 419, 425, 492, 503, 382, 396, 405

[56] References Cited

U.S. PATENT DOCUMENTS

| | | | |
|---|---|---|---|
| 2,772,717 | 12/1956 | Ware | 198/444 |
| 2,966,250 | 12/1960 | Robock | 198/443 |
| 3,050,174 | 8/1962 | Billett | 198/443 |
| 3,323,633 | 6/1967 | Engel et al. | 198/461 |
| 3,414,110 | 12/1968 | Ellis et al. | 198/443 |
| 3,650,566 | 3/1972 | Lee et al. | 198/461 |
| 3,717,751 | 2/1973 | Fluck | 198/503 |
| 3,721,330 | 3/1973 | Crawford et al. | 198/461 |

*Primary Examiner*—Joseph E. Valenza
*Assistant Examiner*—Jonathon D. Holmes
*Attorney, Agent, or Firm*—Kinney and Schenk

[57] ABSTRACT

An apparatus for arranging randomly spaced and oriented workpieces, especially frozen hamburger patties, has a plurality of devices for unstacking or unshingling stacked or shingled workpieces. The apparatus includes a pair of downwardly converging surfaces obliquely oriented with respect to the horizontal and a convoluted transport conveyor. The transport conveyor extends through the converging surfaces and assures a substantially horizontal orientation downstream of the converging surfaces. The illustrated apparatus discharges frozen hamburger patties in a predictable orderly fashion, either in a straight line shingled fashion or in a side by side arrangement. In a disclosed optional feature, a sheet of paper is interposed between the patties and a collection conveyor where the patties are discharged.

17 Claims, 12 Drawing Figures

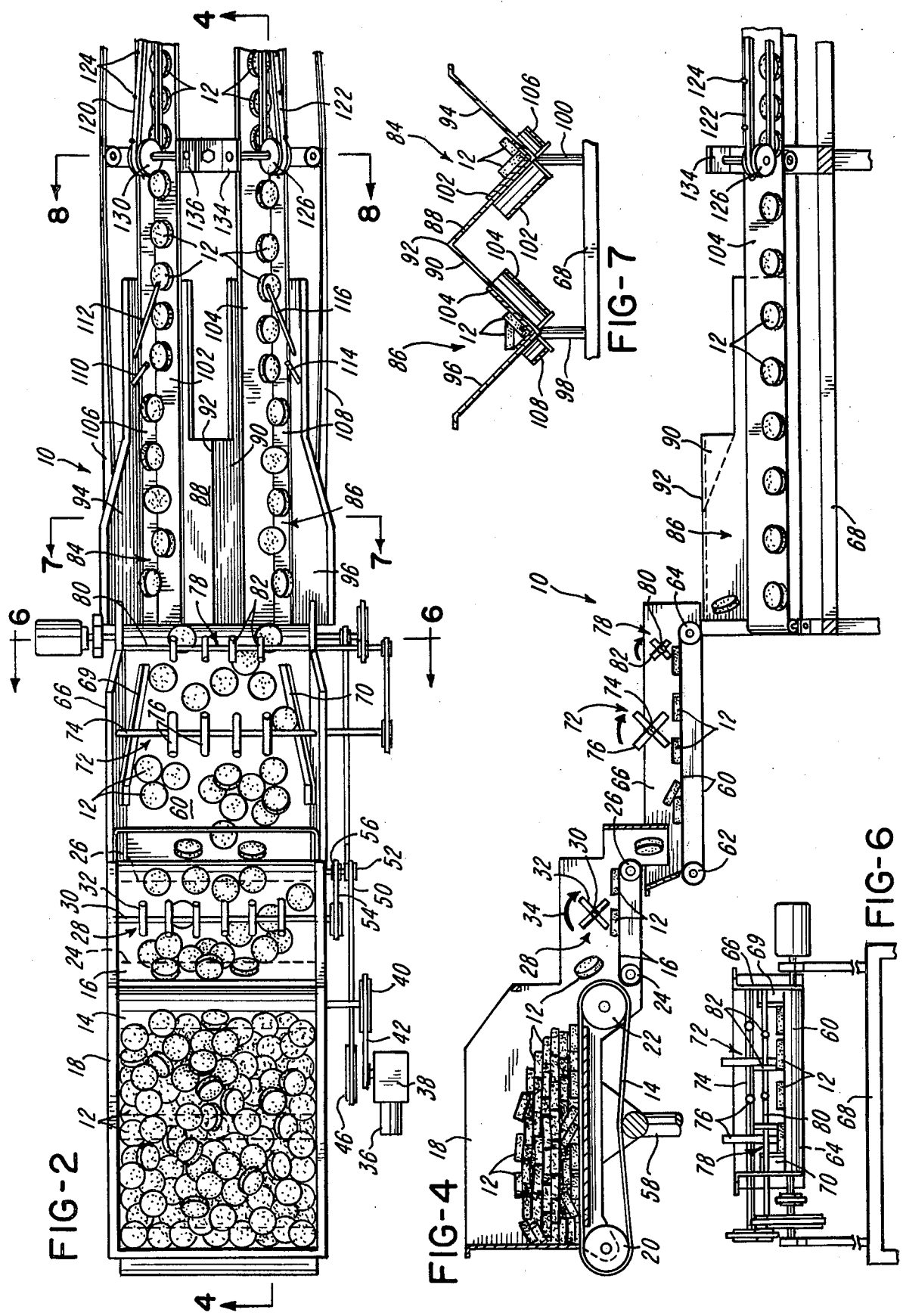

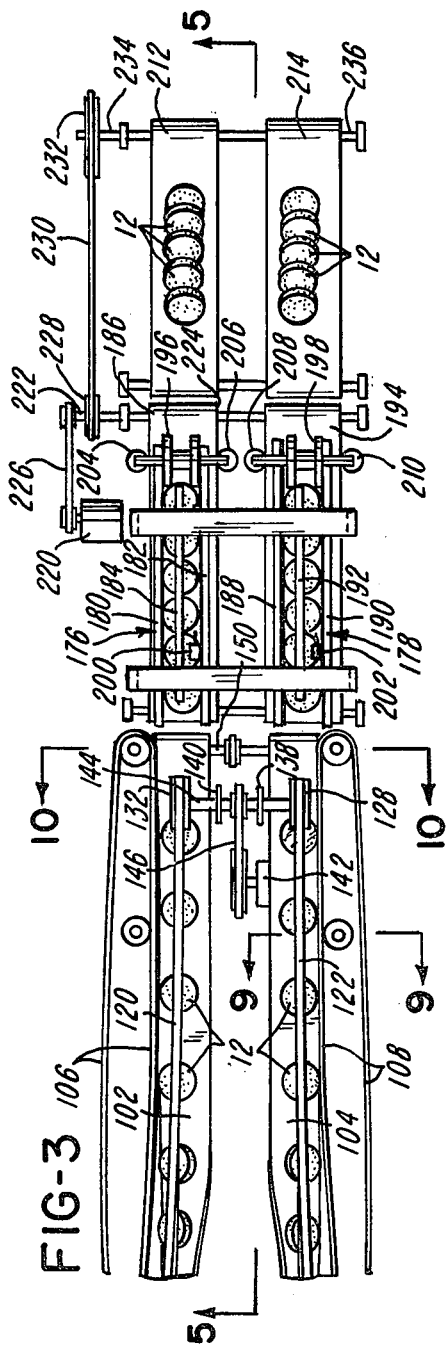
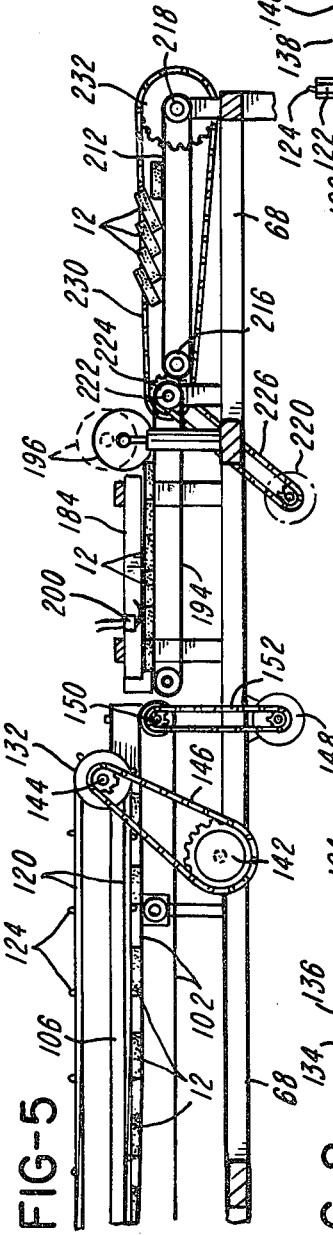
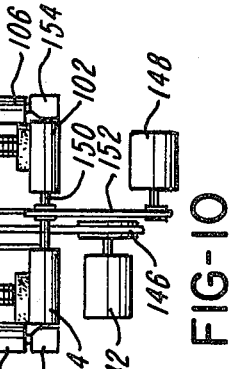
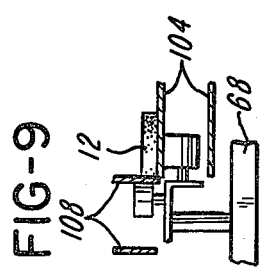
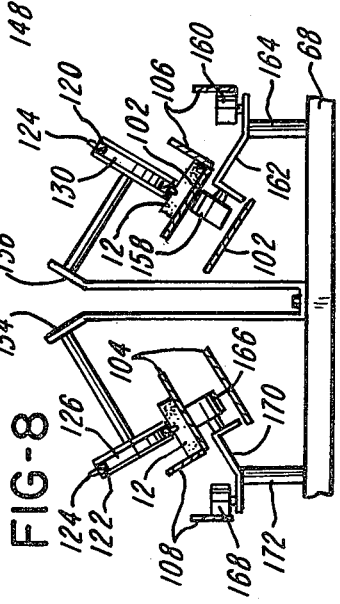

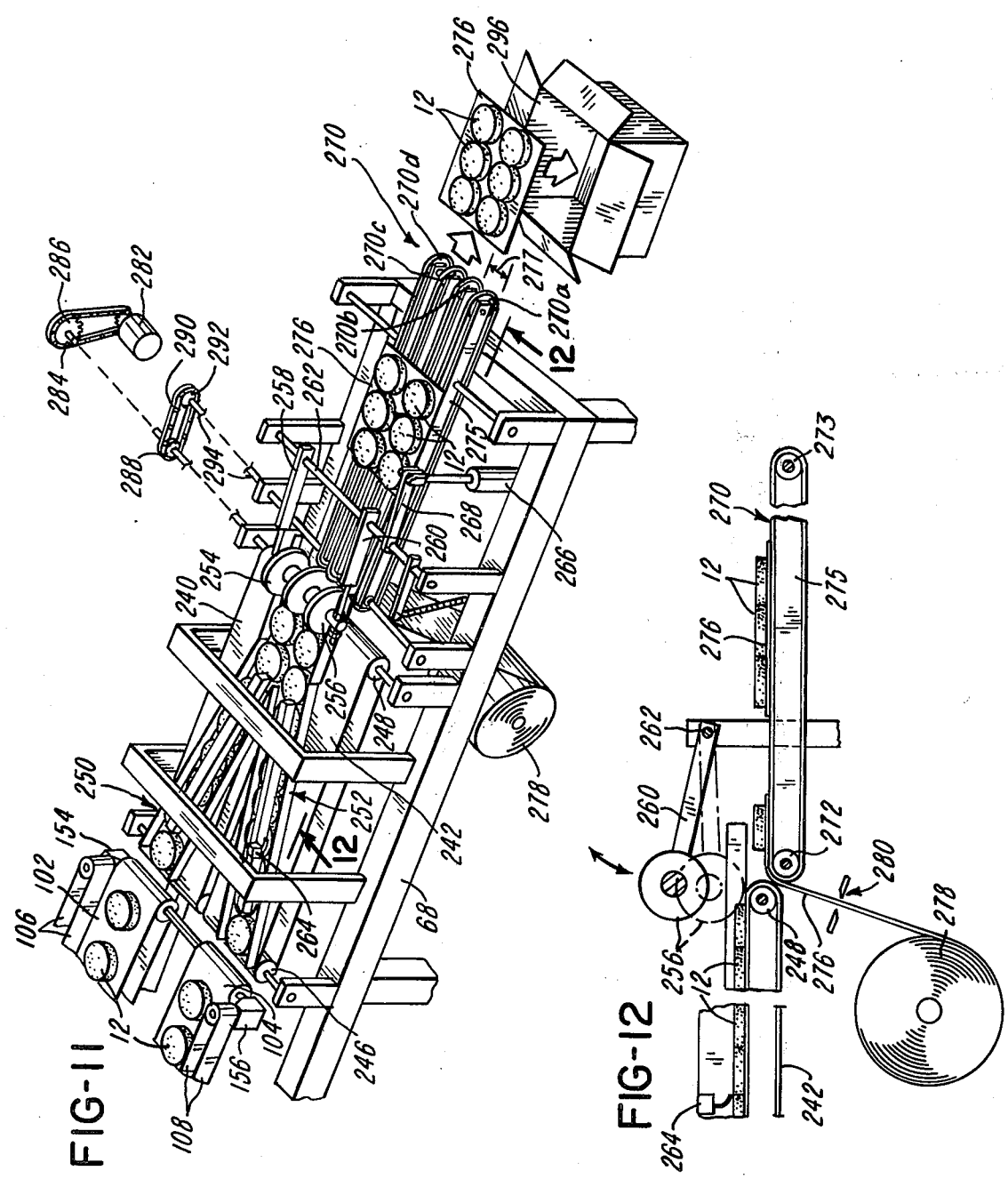

APPARATUS FOR ARRANGING WORKPIECES IN A PREDICTABLE RELATIONSHIP AND GROUPING

BACKGROUND OF THE INVENTION

The present invention relates generally to material handling equipment and more particularly concerns an apparatus for arranging randomly oriented workpieces of different shapes in a predictable pattern. The invention will be specifically disclosed in connection with an apparatus for arranging randomly oriented frozen meat patties of various shapes, such as round, rectangular, oblong, stick, etc., in a predictable relationship and grouping from which a worker or automated machinery may rapidly pick up the patties and place them in a box for shipment.

In the processing of frozen meat patties, such as those which are subsequently used as hamburgers in commercial eating establishments, a conveyor is commonly used to transport the patties prior to packing for shipment. Workers, standing beside the conveyors, remove these patties, which are randomly arranged, from the conveyors and manually place them in shipping boxes. Considerable time is now required of the workers in locating and removing the patties from the conveyor and packaging them in a box or other packaging material. Much of the time required of workers performing this task is a consequence of the random and unpredictable orientation in spacing and orientation of the patties on the conveyor. It is thus highly desirable to arrange these patties in predictable patterns which will enable the workers to package the patties more efficiently. Increased efficiency will result in a lower per unit handling cost for the workpiece.

It is thus an object of the present invention to provide an apparatus for arranging workpieces, such as meat patties for example, in a predictable and organized manner.

It is a further object of the present invention to provide an apparatus which enables workers to package workpieces such as meat patties more efficiently.

It is a further object of the present invention to provide an apparatus which handles a wide range of workpiece sizes and shapes with little or no adjustment.

It is yet another object of the present invention to provide an apparatus for arranging workpieces that will accommodate substantial irregularities in workpiece shapes.

It is still another object of the present invention to provide an apparatus that will arrange workpieces in a predictable manner which does not require a high degree of operational precision.

Yet another object of the present invention is to provide an apparatus for controlling distribution of workpieces that utilizes continuously moving nonrecipicating elements.

It is yet another aspect of the present invention to provide a system which gradually and progressively increases control and distribution over a plurality of workpieces.

SUMMARY OF THE INVENTION

In accordance with the present invention, an apparatus is provided for arranging randomly oriented workpieces in a predictable pattern. The apparatus includes a pair of downwardly converging surfaces which are obliquely oriented with respect to the horizontal. A convoluted transport conveyor extends through the pair of converging surfaces in substantially the same plane as one of the obliquely oriented converging surfaces. The transport conveyor extends downstream of the converging surfaces and changes planes at a downstream location to a substantially horizontal orientation.

In accordance to a further aspect of the invention, a transport conveyor is in substantially the same plane as a first of the pair of converging surfaces and a workpiece alignment means is provided which extends from a second of the converging surfaces for flipping workpieces resting on the second surface onto the transport conveyor as the workpiece is advanced past the alignment means by the transport conveyor.

In accordance to another aspect of the invention, the workpiece alignment means includes a finger-like guide obliquely extending from the second of the converging surfaces toward the downstream direction of the transport conveyor movement.

Yet another aspect of the present invention includes a transport means for transporting a plurality of workpieces and discharging the transported workpieces into the pair of downwardly converging surfaces.

In accordance to a still further aspect of the present invention, a second transport conveyor extends through the pair of converging surfaces with the second transport conveyor being in substantially the same plane as the second of the converging surfaces.

According to another aspect of the invention, the second transport conveyor is convoluted and extends downstream of the converging surfaces. The second transport conveyor changes planes at approximately the same rate as the first transport conveyor and is substantially perpendicular with respect thereto. This second transport conveyor has a substantially vertical orientation at the location at which the first transport conveyor has a substantially horizontal location.

Another aspect of the invention includes means associated with the transporting means upstream of the converging surfaces for unstacking and unshingling stacked and shingled workpieces on the transport means.

A still further aspect of the invention includes a flexible cleated belt atop the first transport conveyor which is spaced above the first transport conveyor by a predetermined distance for selective engagement with stacked or shingled workpieces on the first transport conveyor. The cleated belt has a working surface which moves in the same direction as the adjacent working surface of the first transport conveyor but which has a linear velocity which exceeds the linear velocity of the first transport conveyor.

In a more specific form of the invention, two pair of adjoining obliquely oriented downwardly converging surfaces are included with each pair of surfaces having a convoluted transport conveyor in substantially the same plane as the obliquely oriented surface adjacent the adjoining pair of surfaces. Each of the transport conveyors extends downstream of the converging surfaces and changes planes at a downstream location from the obliquely orientation to a substantially horizontal orientation.

Yet another aspect of the present invention includes means for directing workpieces on the transport means toward the adjoining surfaces of the two pair of downwardly converging surfaces.

Still another aspect of the invention includes a chute downstream of the horizontal orientation of the transport conveyor. The workpieces are directed into the chute and queued or accumulated in a single line atop a subjacent conveyor in accordance to the position of a gate at the end of the chute. The gate is operative to selectively terminate downstream movement of the workpieces despite relative movement of the subjacent conveyor.

Another aspect of the present invention includes a collection conveyor downstream of the gate on the chute. The collection conveyor moves at a linear velocity which is less than the linear velocity of the subjacent conveyor beneath the chute and workpieces therein. The subjacent conveyor deposits workpieces on the collection conveyor in a shingled manner when the gate is moved to an open position.

A still further aspect of the present invention includes a counter which is mounted upon the chute for incrementally counting workpieces passing therethrough. The gate is opened in response to a predetermined count of the counter.

Yet another aspect of the present invention includes means for interposing a sheet of paper between the collection conveyor and the workpieces deposited thereon.

Another aspect of the invention includes a plurality of axially spaced collection conveyors with each of the collection conveyors being supported upon its discharge end so as to provide an unobstructed axial spacing between the collection conveyors with the working surfaces of the collection conveyors lying in a substantially horizontal plane. A sheet of paper is preferably interposed between these collection conveyors and workpieces deposited on the top of the collection conveyors so that a fork like lifting instrument may be positioned beneath the workpieces and the paper from the discharge end.

BRIEF DESCRIPTION OF THE DRAWINGS

Other objects and advantages of the invention will become apparent from reading the following detailed description and upon reference to the drawings, in which:

FIG. 2 is a plan view of the upstream end of the apparatus illustrated in FIG. 1.

FIG. 3 is a plan view of the downstream end of the apparatus illustrated in FIG. 1.

FIG. 4 is an elevational view of the upstream portion of the apparatus of FIG. 1 illustrated in FIG. 2 taken along line 4—4 in FIG. 2.

FIG. 5 is an elevational view of the apparatus of FIG. 1 illustrated in FIG. 3 taken along line 5—5 in FIG. 3.

FIG. 6 is a cross sectional line taken along line 6—6 of FIG. 2 illustrating the interrelationship between a pair of rakes and frozen hamburger patties on the apparatus of FIG. 1.

FIG. 7 is a sectional view taken along line 7—7 in FIG. 2 illustrating several frozen meat patties being transported along a pair of converging surfaces with each pair of converging surfaces having both bottom and side conveyors.

FIG. 8 is a sectional view taken along line 8—8 of FIG. 2 showing the relationship between the frozen meat patties, the bottom and side conveyors and a flexible drive belt.

FIG. 9 is a sectional view taken along line 9—9 of FIG. 3 showing one of the lanes of the frozen hamburger patties being transported by one set of bottom and one set of side conveyors.

FIG. 10 is a cross sectional view taken along line 10—10 of FIG. 3 illustrating two sets of bottom and side conveyors and two flexible drive belts and their relationship to drive motors.

FIG. 11 is a perspective view of a modified version of the downstream end of an apparatus similar to FIG. 1 showing a plurality of frozen hamburger patties being positioned upon a severed piece of paper.

FIG. 12 is a sectional view taken along line 12—12 of FIG. 11.

Figure 1:
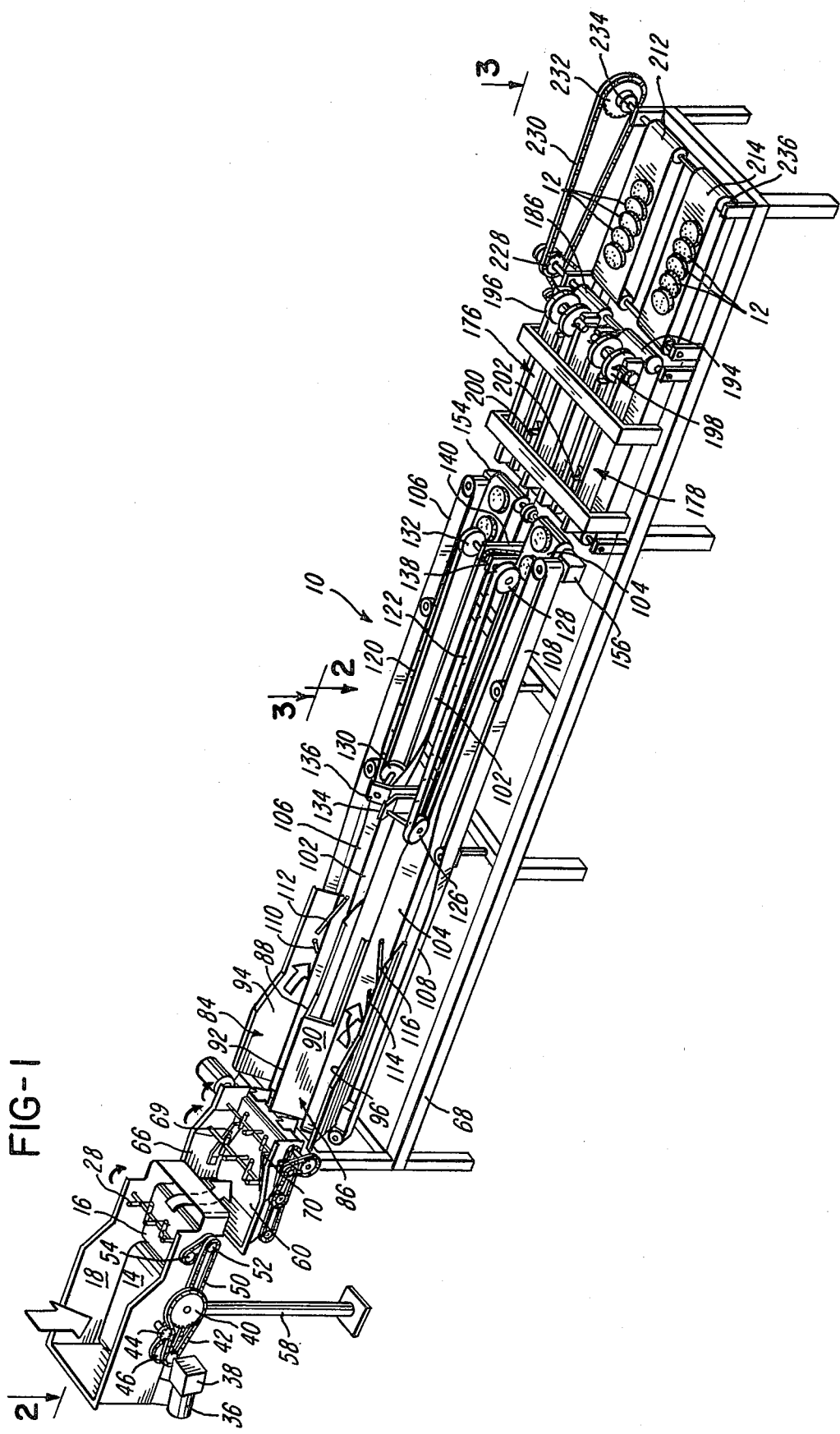
FIG. 1 is a perspective view of an apparatus for receiving randomly oriented frozen meat patties and stacking them in an aligned, shingled relationship.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE PREFERRED EMBODIMENT

Referring now to the drawings and to FIG. 1 in particular, an apparatus for receiving randomly oriented and spaced workpieces of a wide range of shapes and sizes is generally designated by the numeral 10. The apparatus 10 is illustrated as receiving a multitude of frozen hamburger patties collectively identified by the numeral 12 from a first conveyor 14. While on the conveyor 14, the hamburger patties 10 are randomly spaced and oriented. This random distribution of patties on the conveyor 14 is illustrated in FIG. 2. The first conveyor 14 transports the frozen patties 12 from left to right in the depiction of FIGS. 1 and 2 and discharges the patties 12 onto a second conveyor 16 which is aligned with the first conveyor 14.

Both the conveyors 14 and 16 are illustrated as driven about rollers rotatably secured within a hopper frame 18, conveyor 14 being driven about rollers 20 and 22 and conveyor 16 being driven about rollers 24 and 26. The hopper frame 18 is designed to receive a large quantity of patties 12 for deposit on the conveyor 12. A first alignment means shown as a rake 28 is positioned about the second conveyor 16. This rake 28 is the first of a series of devices for insuring that none of the patties that reach the downstream end of the apparatus 10 are in a shingled or overlying relationship and includes a rotatable drive shaft 30 extending in a direction substantially parallel to the rollers 24 and 26 (as well as rollers 20 and 22) with a plurality of axially spaced fingers 32 extending radially therefrom. As best seen in FIG. 4, the radial extension of these fingers 32 terminates about the conveyor 16, the radial terminus of fingers 32 being spaced from belt 16 by a predetermined distance slightly in excess of the height of a single frozen patty 12 lying flatly on the conveyor belt 16. In this way, any patties that are lying atop or shingled upon another patty 12 will be dislodged from that position to a position lying flatly upon the conveyor 16. It is also seen from arrow 34 in FIG. 4, that the rotation of fingers 32 is in the same direction as the conveyor belt 16 so that the underside of rake 28 moves in a direction that is generally opposite that of the topside or working surface of conveyor belt 16.

FIGS. 1 and 2 show that the conveyors 14 and 15 and the rake 28 are driven in timed relationship to each other. Motor drive 36 operates through a gear box 38 to drive a gear 40 by way of a chain 42. The chain 42 also rotates a gear 44 (see FIG. 1) which, in turn, rotates a gear 46 which rotates the roller 26 through a chain 50 and a gear 52. The rake 28 is driven by a chain 54 which joins a gear connected to its drive shaft 30 and a gear 56 affixed to the drive shaft of roller 26. The hopper frame 18 is elevated above the ground by a vertical support 58.

Patties discharged from the conveyor 16 are dropped onto a third conveyor 60 which is supported on rollers 62 and 64. The rollers 62 and 64 are rotatably secured in a weight basket 66 supported upon a frame 68. The weight basket 66 senses the weight of its contents and, when the sensed weight exceeds a predetermined weight, limits further accumulation of patties 12 on conveyor 60 by terminating upstream operation of conveyors 14 and 16 until such time as the accumulated weight falls below the predetermined weight. Since the operation of weight baskets in the manner is well known to those skilled in the art, a detailed description thereof will be omitted in the interests of brevity. Frame 68, along with the vertical support 58 and the floor upon which both supports are resting, forms a base for the illustrated apparatus. The conveyor 60 is aligned with the conveyors 14 and 16 with the rollers 62 and 64 having axes of rotation generally parallel to the axes of rollers 20, 22, 24 and 26. Weight basket 66 also has a pair of angularly oriented guides 69 and 70 (see FIGS. 1 or 2) convergingly angled in the downstream direction of the conveyor 60 and spaced intimately above the conveyor 60 so as to direct any patties on the outer edges of the conveyor belt 60 onto the inner portion thereof. A pair of rakes, similar to rake 28 above conveyor 16, are disposed above conveyors 60. The first of these two rakes, positioned above conveyor 60, is identified by the numeral 72 and includes a drive shaft 74 rotatably journaled in weight basket 66 and a plurality of finger-like projections 76 extending radially outward from drive shaft 74. Like the fingers 32 of rake 28, the radial terminus of fingers 76 are spaced from the top surface of conveyor 60 by a distance slightly in excess of the height of a single frozen patty 12. The second of these two rakes above conveyor 60 is downstream of the rake 72 and is identified by the numeral 78 and includes a drive shaft 80 rotatably mounted in the weight basket 66 with a plurality of radially extending fingers 82. Also like the fingers of rakes 28 and 32 before it, fingers 82 terminate above the conveyor 60 by a distance slightly in excess of the height of a single frozen patty 12. Like rake 28, rakes 72 and 78 serve to dislodge any stacked or shingled patties and to position all of the patties 12 flatly upon the top of the conveyor belt (conveyor belt 60 in the case of rakes 72 and 78).

As will be best appreciated from a viewing of FIG. 4, the various conveyors 14, 16 and 60, as well as rakes 32, 72 and 78, create a cascading effect in which the quantity of workpieces or patties 12 is gradually and progressively reduced and the control over the patties and their distribution is gradually and progressively increased. Such a gradual and progressive multi-step operation has proven to be most effective. By the time the frozen patties 12 have traveled beneath the three rakes 28, 72 and 78, any stacked or shingled patties 12 should have been eliminated and all of the patties should be flatly lying on the conveyor belt 60.

Patties discharged from the conveyor 60 over roller 64 are dropped into one of a pair of obliquely oriented (with respect to the horizontal) V-shaped downwardly converging configurations 84 and 86. These V-shaped surfaces are shown most clearly in FIGS. 1, 2 and 7. The V-shaped surfaces 84 have an angularly disposed interior surface 88 which adjoins an angular surface 90 of V-shaped surface 86 at an apex 92 formed at the interface of the surfaces 88 and 90. Each of the surfaces 88 and 90 has a mating and angularly disposed surface with which the surfaces 88 and 90 cooperatively form a V-shaped configuration, surface 94 cooperating with surface 88 to form the V-shaped configuration 84 and surface 96 cooperating with surface 90 to form the V-shaped configuration 86. Columnar supports 98 and 100 (FIG. 7) extend upwardly from the frame 68 to support the V-shaped converging surfaces 86 and 84 respectively.

Each of the surfaces 88, 90, 94 and 96 has a transport conveyor belt which is substantially co-planar with their interior surfaces. Conveyor 102 being substantially co-planar with surface 88 and conveyor 104 being substantially co-planar with surface 90. Similarly, the outer surfaces 94 and 96 have conveyor surfaces which are virtually co-planar therewith. Conveyor 106 is virtually co-planar with outer surface 94 and a surface of conveyor 108 is virtually co-planar with a surface of surface 96. For reasons which will be apparent in the following description, conveyors 102 and 104 will be identified as "bottom" conveyors for purposes of description while conveyors 106 and 108 will be identified as "side" conveyors. As illustrated in the depiction of FIG. 7, when the patties 12 fall into the V-shaped configurations 84 and 86, they may be resting against the inside surface and belts 102 or 104 or the inside surface and belts 106 and 108 or both. It will also be seen from FIG. 7 that the inner surfaces 88 and 90 as well as their respective conveyors 102 and 104 serve to limit downward gravity based sliding movement of workpieces on the outer surfaces 94 and 96 so as to stop the downward sliding movement of a workpiece at a position on the conveyors 106 and 108. The same is true of outer surfaces 94 and 96 and their respective conveyors 106 and 108 with respect to inner surfaces 88 and 90. In other words, a patty 12 sliding down obliquely oriented surface 88 will have its gravity biased sliding movement terminated by surface 94 and conveyor 106. At this terminating position, the patty 12 will be resting against conveyor 102.

The illustrated embodiment is designed to orient all of the patties 12 so as to lie against the bottom belts 102 and 104 on the inside surfaces 88 and 90. In order to achieve this desired orientation, the outside surfaces 94 and 96 each have a pair workpiece alignment means in the form of finger-like guide projections angularly extending toward the mating surface in a downstream direction. Finger guides 110 and 112 extend outwardly from the surface 94 into the path of any patty 12 lying against the outer surface 94 or belt surface 106 or resting upon both of the inner and outer surfaces 88 and 94 or both of the belts 102 and 106. When the patties 12, in any of these orientations, engage the finger-like projection guides 110 or 112, the patties 12 are flipped and forced to resume an orientation in which they are flatly lying against the inner surfaces 88 and 90 and against the belts 102 and 104 in particular. Patties lying flatly against the conveyor belts 102 and 104 pass by the fingers 110 and 112 unimpeded. Two different finger guides 110 and 112 are used so as to engage patties of several different orientations as they pass by guides within the V-shaped configurations 84 and 86.

Outer surface 96 has two fingers 114 and 116 which extend into the V-shaped opening 86 and which are similar to the fingers 110 and 112 on surface 94 except that are symetrically arranged with respect thereto. The operation of these fingers 114 and 116 is identical to that of fingers 110 and 112 with the fingers 114 and 116 forcing orientation of the patties against the surface of bottom conveyor belt 104.

After passing by the fingers 110 and 112 and 114 and 116, all of the patties are lying flatly against the conveyor belts 102 and 104. These conveyor belts 102 and 104, however, are convoluted or partially spiraled so as to change planes downstream of the fingers 110, 112, 114, and 116 to an orientation that is substantially horizontal. In the downstream horizontal orientation, the conveyor belts 102 and 104 are located directly beneath the frozen patties 12 and the gravity bias exerted on the patties no longer urges the patties to the sides of the conveyor belts 104 and 106. Nevertheless, side conveyors 106 and 108 are also partially spiraled and remain in substantially perpendicular relationship to the conveyor 102 and 104. This parallel partial spiraling of the side conveyors 106 and 108 prevent the workpieces 12 from sliding off the bottom conveyors during the transition to horizontal orientation. It is because the conveyors 102 and 104 are beneath and the conveyors 104 and 106 beside the patties 12 that they are termed "bottom" and "side" conveyors respectively for purposes of description. The bottom and side conveyors 102, 104 and 104, 106 travel at approximately twice the nominal rate of conveyor 60 within weight basket 66. This disparity with the speed of conveyor 60 results in large and random spaces between the patties on the upstream end of angled conveyors 102, 104, 106 and 108.

A flexible cleated belt is positioned above each of the belts 102 and 104 as they begin their transition from the oblique orientation within the V-shaped configuration of surfaces 84 and 86 to the substantially horizontal downstream relationship described above. Cleated belt 120 is positioned above the conveyor belt 102 and cleated belt 122 is positioned above the conveyor belt 104, both of these cleated belts 120 and 122 being rotated with linear velocities in excess of the linear velocity of the respective conveyor belts 102 and 104 disposed beneath the cleated belts 120 and 122. Further, the cleated belts 120 and 122 are rotated in a direction that is opposite that of the conveyor belts 102 and 104. Consequently, the underside (which constitutes the working surface) of belts 120 and 122 of the cleated belts 120 and 122 and the topside (which is the working surface) of conveyor belts 102 and 104 are proximally located with respect to each other and travel in the same linear direction.

The cleated belts 120 and 122 are preferably highly flexible and have a plurality of outwardly projecting cleats 124. The belts 122 and 124 are also spaced above the conveyor belts 102 and 104 by a distance slightly in excess of the spacing of a single frozen patty 12. In the event that a patty 12 manages to survive the series of rakes 28, 74 and 80, as well as the fingers 110, 112 or 114 and 116 in a stacked or shingled relationship to another patty, the uppermost of the stacked or shingled patties will be engaged by the cleats 124 on one of the flexible belts 120 and 122. When the top one of a pair of stacked or shingled patties is engaged by the cleats 124 of belts 120 or 122, one of the belts 120 or 122 advances that top patty at a speed that is greater than that of the bottom belts 102 or 104. Due to the disparity in speeds between the belts 102, 104, 106 and 108 on one hand and conveyor 60 on the other hand, there is, as mentioned above, a large spacing between the patties 12 on belt 102 or 104 as they commence their interaction with the cleated belts 120 and 122. As a shingled or overlayed patty is accelerated with respect to its underlying patty, it is relocated in one of these large spacings. The cleated belts 120 and 122 thus eliminate any stacked or shingled patties that may have passed beneath the rakes or fingers upstream or which may have developed in the downstream travel therefrom.

The cleated belts 122 and 124 are supported above the top surface of conveyor belts 102 and 104 by a pair of pulleys 126 and 128 above conveyor belt 104 and a pair of pulleys 130 and 132 above conveyor belt 102. These pulleys are, in turn, rotatably supported by a pair of angled supports 134 and 136 and a pair of columnar supports 138 and 140, angled supports 134 and 136 supporting pulleys 126 and 130 respectively and columnar supports 138 and 140 supporting pulleys 128 and 132 respectively. As most clearly shown in FIG. 8, the angled supports 136 and 138 extend upwardly from the frame 68. Although not as clearly illustrated in the drawings, the columnar supports 138 and 140 similarly extend upwardly from the frame 68.

As shown in FIGS. 3 and 5, cleated belts 120 and 122 are driven by a motor 142 which rotatably powers a drive shaft 144, to pulleys 128 and 132 by way of a chain drive 146. A motor 148 drives the conveyor belts 102 and 104 through a common drive shaft 150 and a chain drive 152. As further seen from the depiction of FIG. 10, the side conveyors are driven off of drive shaft 150 through angled gear boxes, side conveyor 106 being driven through angled gear box 154 and side conveyor 108 being driven through angled gear box 156.

FIGS. 8 and 9 show that the bottom (102 and 104) and side (106 and 108) conveyors are engaged at their intermediate portions by support rollers. FIG. 8 shows the underside of the top portion of conveyor belt 102 being engaged by support roller 158 and the inner surface of the outer portion of side conveyor 106 being engaged by support roller 160. Both of the support rollers 158 and 160 are rotatably mounted to an angle support 162 which is supported above the frame 68 by a columnar support 164. Similarly, the underside of the top portion of conveyor belt 104 is engaged by support roller 166 and the inner surface of the outer portion of side conveyor 108 is engaged by support roller 168. The support rollers 166 and 168 are both rotatably mounted to angle support 170 which is rigidly mounted atop a columnar support 172 extending upward from the frame 68.

While transported by the bottom conveyors 102 and 104, the patties 12 are irregularly and unpredictably spaced from each other. A queuing or accumulation conveyor 186 or 194 is thus used to arrange the patties 12 in a regulated end to end relationship. Frozen patties discharged from the bottom conveyors 102 and 104 are directed into guide chutes 176 and 178. Each of these guide chutes are formed from a pair of horizontal side guides and a vertical guide positioned over a queuing or accumulation conveyor 186 or 194. Guide chute 176 consists of horizontal side guides 180 and 182 which are horizontally spaced by a distance slightly in excess of the diameter of one of the frozen patties 12. A vertical guide 184 is equally spaced between the side guides 180 and 182 and is vertically spaced above the conveyor by a distance exceeding the vertical height of one of the patties. The guide chute 176 is positioned above the queuing or accumulation conveyor 186. Similarly, guide chute 178 includes horizontal side guides 188 and 190 and vertical guide 192. The guide chute 178 is positioned above the queuing or accumulation conveyor 194.

When directed into one of the guide chutes 176 and 178, the first of a plurality of patties 12 are advanced along respective conveyors 186 and 194 until such time as the first of these patties engages a spool gate, spool gate 196 being disposed at the downstream end of guide chute 176 and spool gate 198 being disposed at the downstream end of guide chute 178. When the first patty so engages the spool gate, downstream movement of that patty 12 on the conveyor belt 186 or 194 is terminated and relative movement between that patty 12 and the subjacent conveyor belt 186 or 194 moving underneath commences.

Downstream movement of a second of a plurality of patties 12 continues until it engages the first patty at which time the second patty is held stationary by the first while the conveyor belt 186 or 194 continues to move beneath the patty. This process continues until such time as a predetermined number of patties is queued in an accumulated end to end relationship in the chute. When a counter 200 or 202 indicates a count equal to this predetermined number, a pair of cylinders are activated to lift one of the spool gates 196 or 198. Counter 200 is positioned on chute 176 and is advanced one incriment by each patty 12 passing through chute 176 and counter 202 is positioned on chute 178 and is incrimentally advanced by each patty 12 passing through the chute 178.

After the counters 200 and 202 have reached a predetermined count (five in the illustrated embodiment of FIGS. 1–10), the cylinders associated with the counter reaching that count are activated to lift corresponding spool gates 196 or 198. Cylinders 204 and 206 are attached to the ends of spool gate 196 and responsive to counter 200. Similarly cylinders 208 and 210 are affixed to the ends of the spool gate 198 and are responsive to counter 202.

The lifting of spool gates 196 or 198 permits the queue of patties 12 collected in end to end relationship behind the spool gate 196 or 198 to be discharged onto collection belts 212 or 214. FIG. 5 shows the collection belt 212 rotatably mounted on rollers 216 and 218, both of which are rotatably secured to the frame 68. A motor 220 drives a shaft 222 which is joined to a roller 224 driving the conveyors 186 and 194 by way of a chain drive 226. Roller 218 of conveyor 212 is driven off shaft 222 through a sprocket 228 affixed to shaft 222, a chain drive 230 and a sprocket 232 affixed to shaft 234, which chain drive and sprockets drive the roller 218. A corresponding driving roller 236 for collection belt 214 is driven likewise. Since the sprocket 232 has a greater diameter than that of sprocket 228, the collection belts 212 and 214 are moved at a rate which is slower than the rate of conveyor belts 186 and 194. The movement of the conveyors 186, 194 and 212, 214 are thus in timed relationship to each other. Due to the disparity in the speeds of the belts 186 and 194 on one hand and 212 and 214 on the other hand, the patties 12 are presented in a straight shingled (or overlapped) fashion on the collection belts 212 and 214. This arrangement is highly predictable and orderly and permits an operator aside the collection belts 212 and 214 to quickly grasp the shingled collection and to place all of the shingled patties 12 in a container for shipment.

FIGS. 11 and 12 show a modification of the downstream portion of the apparatus depicted in FIGS. 1–10. In the modified version of the apparatus, the bottom conveyors 102 and 104 are discharged onto queuing conveyors 240 and 242, which are both supported upon rollers 246 and 248, the rollers 246 and 248 being rotatably mounted to the frame 68. A pair of queuing or accumulation chutes 250 and 252 are constructed similar to the previously described chutes 176 and 178, excepting that they are convergingly directed in the downstream direction to bring the patties 12 in side-by-side relationship at the downstream end of the chutes 250 and 252. The queuing chutes are positioned above the respective queuing conveyors 240 and 242 and received patties discharged from bottom conveyors 102 or 104.

Spool gates 254 and 256 are positioned at the downstream end of the chutes 250 and 252. Unlike the spool gates 196 and 198 of FIGS. 1–10, the spool gates 254 and 256 are joined together and secured upon their end portions by a swingable support. This swingable support includes two arms 258 and 260 which are rigidly attached to a rotatable shaft 262. When counter 264 mounted on chute 252 reaches a predetermined count, a cylinder 266 is actuated to pull down a lever arm 268. The lever arm 268 is rigidly attached to the rotatable shaft 262 and downward movement of a piston within cylinder 266 effectuates an upwardly arcuate movement of spool gates 254 and 256. When the spool gates 254 and 256 are so moved, the accumulated queue of patties 12, which have collected behind the gates 254 and 256, are released and discharged onto a plurality of spaced and aligned collection conveyors 270 extending beyond the queuing or accumulation conveyors 240 and 242. A sheet of paper 276 is interposed between the collection conveyors 270 and the patties 12. This sheet 276 is advanced from paper roll 278 and is severed by a set of knife blades 280 positioned between the paper roll 278 and the collection conveyor 270.

The queuing or accumulation conveyors 240 and 242, as well as the collection conveyor 270, are driven by a motor 282 which drives a shaft 284. The shaft 284 drives the rollers 248 and the conveyors 240 and 242. A sprocket 286 transmits the rotary power between motor 282 and shaft 284. A further sprocket 288 affixed to shaft 284 transmits the received power through a drive chain 290 on a further sprocket 292. This further sprocket 292 is affixed to a drive shaft 294 which powers the roller 272 of the collection conveyor 270. Since the sprockets 288 and 292 are of the same diameter, conveyors 240 and 242 travel at the same speed as collection conveyors 270. There are four collection conveyors 270 in the illustrated embodiment of FIG. 11. These four conveyors 270a, 270b, 270c and 270d are parallel to each other and spaced by a distance 277 which is substantially less than the diameter of the patties 12. Further, each of the spaced conveyors 270a, 270b, 270c and 270d is supported on its discharge end by a pulley 273, which is, in turn, rotatably supported by a pair of flat plates 275. Each pair of flat plates is cantilevered outwardly so as to leave the axially spacings 277 free of obstructions. These unobstructed axial spacings 277 permit a forklike lifting instrument to be positioned beneath the patty carrying sheet of paper 276 from the discharge end of the conveyors for quick or automated removal of the patties 12 and paper 276 for packaging. When removed from the collection conveyors 270, the patties 12 are uniformly spaced in side-by-side aligned relationship with each other atop the sheet of paper 276 for placement into a shipping box 296. An operator aside the collection conveyor 270 merely picks up the paper 276 with the orderly arrangement of patties 12 thereon and stacks the paper and patties in the box 296 for shipment. Alternatively, an automated piece of equipment may remove and package the predictably arranged patties 12 and paper 276.

Thus it is apparent that there has been provided, in accordance with the invention, an apparatus that fully satisfies the objects, aims, and advantages set forth above. While the invention has been described in conjunction with a specific embodiment thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An apparatus for arranging randomly oriented workpieces in a predictable pattern, comprising:
   a pair of downwardly converging surfaces, said converging surfaces being obliquely oriented to the horizontal;
   a first convoluted transport conveyor, said transport conveyor extending through said pair of converging surfaces, said first transport conveyor being in substantially the same plane as the first of said pair of obliquely oriented converging surfaces, said first transport conveyor extending downstream of said converging surfaces and changing planes at a downstream location to a substantially horizontal orientation;
   a second convoluted transport conveyor, said second conveyor extending through said pair of converging surfaces, said second transport conveyor being in substantially the same plane as the second of said pair of obliquely converging surfaces, said second transport conveyor extending downstream of said converging surfaces and changing planes at a downstream location to a substantially perpendicular relationship with respect to said first transport conveyor, said second transport conveyor having a substantially vertical orientation at the location said first transport conveyor has a substantially horizontal orientation;
   at least one finger-like guide for flipping said workpieces resting on said second converging surface onto said first convoluted transport conveyor as said workpieces are advanced past said guide by said first and said second convoluted transport conveyors, said guide obliquely extends outwardly in the downstream direction of movement of said first and said second convoluted transport conveyors from said second converging surface; and
   means for transporting and discharging a plurality of said workpieces into said pair of converging surfaces, said means for transferring and discharging being located upstream of said converging surfaces.

2. An apparatus as recited in claim 1 further comprising:
   means for unstacking and unshingling stacked and shingled workpieces on said transport means, said means being associated with said means for transporting and discharging, said means being located upstream from said pair of converging surfaces.

3. An apparatus as recited in claim 2 further comprising:
   a flexible cleated belt atop the first transport conveyor, said cleated belt being spaced above said first transport conveyor by a predetermined distance for selective engagement with stacked or shingled workpieces on said first transport conveyor, said cleated belt having a linear velocity which exceeds the linear velocity of said first transport conveyor with the working surfaces of said cleated belt and said first transport conveyor traveling in the same direction.

4. An apparatus as recited in claim 3 further comprising:
   at least two pair of adjoining obliquely oriented downwardly converging surfaces, each pair of said surfaces having a convoluted transport conveyor in substantially the same plane as the obliquely oriented surface adjacent to said adjoining pair, each of said transport conveyors extending downstream of said location to a substantially horizontal orientation.

5. An apparatus as recited in claim 4 further comprising:
   means for directing the workpieces on said transport means toward the adjoining surfaces of said two pair of downwardly converging surfaces.

6. An apparatus as recited in claim 5 wherein said means for transporting discharges workpieces into said pair of downwardly converging surfaces by abandoning subjacent support of the workpieces.

7. An apparatus as recited in claim 2 further comprising:
   a chute downstream of said horizontal orientation of said transport conveyor, said workpieces being directed into said chute atop a subjacent conveyor and queued in a single line in accordance to the position of a gate at the end of said chute, said gate being operative to selectively terminate downstream movement of said workpiece despite relative movement of the subjacent conveyor.

8. An apparatus as recited in claim 7 further comprising:
   a plurality of axially spaced collection conveyors downstream of said gate, each of the collection conveyors being supported upon its discharge end so as to provide an unobstructed axial spacing between the collection conveyors with the working surfaces of each of the collection conveyors lying in a substantially horizontal plane.

9. An apparatus as recited in claim 7 further comprising:
   a collection conveyor downstream of said gate, said collection conveyor moving at a linear velocity less than the linear velocity of the subjacent conveyor beneath the workpieces queued behind said gate, and said subjacent conveyor depositing workpieces on said collection conveyor when said gate is in an open position.

10. An apparatus as recited in claim 9 further comprising:
    a counter incrementally responsive to the movement of a workpiece past a predetermined location on said chute, said gate being operable in response to a predetermined count on said counter.

11. An apparatus as recited in claim 10 further comprising:
   means for interposing a sheet of paper between said collection conveyor and workpieces deposited upon said collection conveyor.

12. An apparatus as recited in claim 10 further comprising:
   means for interposing a sheet of papers between said collection conveyors and workpieces deposited upon said collection conveyors.

13. An apparatus for arranging randomly oriented workpieces in a predictable pattern, said apparatus comprising:
   a pair of downwardly converging surfaces, said surfaces being obliquely oriented to the horizontal;
   at least one convoluted transport conveyor, said transport conveyor extending through said pair of converging surfaces, said transport conveyor being in substantially the same plane as the first of said obliquely oriented converging surfaces, said transport conveyor extending downstream of said converging surfaces and changing planes at a downstream location to a substantially horizontal orientation; and
   permanently affixed inelastic means, said inelastic means move said workpieces from a position resting on said second converging surface to a position resting on said convoluted transport conveyor as said workpieces are advanced past said inelastic means.

14. An apparatus as recited in claim 13 wherein said permanently affixed inelastic means further comprises:
   at least one finger-like guide, said guide extending obliquely outward from said second converging surface toward the downstream direction of movement of said convoluted transport conveyor.

15. An apparatus as recited in claim 14 further comprising:
   means for transporting and discharging a plurality of workpieces into said pair of downwardly converging surfaces, said means for transporting and discharging being located upstream of said converging surfaces.

16. An apparatus as recited in claim 15 wherein said convoluted transport conveyor further comprises:
   a second convoluted transport conveyor extending through said pair of converging surfaces, said second transport conveyor being in substantially the same plane as said second of said pair of obliquely oriented converging surfaces, said second transport conveyor extending downstream of said second converging surface and changing planes at a downstream location to a substantially perpendicular relationship with respect to said first transport conveyor.

17. An apparatus for separating stacked or shingled workpieces, said apparatus comprising:
   a base;
   a pair of downwardly converging surfaces, said surfaces being obliquely oriented to the horizontal;
   at least one convoluted transport conveyor, said transport conveyor extending through said pair of converging surfaces, said transport conveyor being in substantially the same plane as the first of said obliquely oriented converging surfaces, said transport conveyor extending downstream of said converging surfaces and changing planes at a downstream location to a substantially horizontal orientation;
   at least one flexible convoluted cleated belt positioned atop said convoluted transport conveyor, said flexible cleated belt having a working surface proximal to said working surface of said transport convoluted transport conveyor and spaced a predetermined distance thereabove, said working surface of said flexible cleated belt being movable in the same direction as said working surface of said convoluted transport conveyor, said cleated belt being operative to advance a workpiece stacked or shingled atop another subjacent workpiece on said convoluted transport conveyor at a rate greater than said transport convoluted conveyor advance the subjacent workpieces;
   means for preventing said workpieces from sliding off said convoluted transport conveyor during said convoluted transport conveyors transition to the horizontal; and
   means for transporting and disclosing a plurality of said workpieces into said pair of converging surfaces, said means for transferring and discharging being located upstream of said converging surfaces.

* * * * *